United States Patent
Negishi et al.

(10) Patent No.: US 6,414,970 B1
(45) Date of Patent: Jul. 2, 2002

(54) DIGITAL SIGNAL MULTIPLEXING METHOD AND APPARATUS, DIGITAL SIGNAL TRANSMISSION METHOD AND APPARATUS, DIGITAL SIGNAL RECORDING METHOD AND APPARATUS AND RECORDING MEDIUM

(75) Inventors: Shinji Negishi; Katsumi Tahara; Mikita Yasuda, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/235,786

(22) Filed: Jan. 22, 1999

(30) Foreign Application Priority Data

Jan. 26, 1998 (JP) .......................................... 10-012999

(51) Int. Cl.$^7$ ................................................. H04J 3/07
(52) U.S. Cl. ........................ 370/510; 370/503; 370/537
(58) Field of Search ................................. 370/503, 513, 370/537, 510, 538, 539, 540, 541, 244, 394, 468, 474, 517, 516, 498

(56) References Cited

U.S. PATENT DOCUMENTS 5,923,811 A * 7/1999 Kawamura et al. ........... 386/65
6,081,526 A * 6/2000 Saeijs et al. ................ 370/394
6,157,674 A * 12/2000 Oda et al. ................... 370/503
6,219,358 B1 * 4/2001 Pinder et al. ............... 370/537

* cited by examiner

Primary Examiner—Ajit Patel
Assistant Examiner—Saba Tsegaye
(74) Attorney, Agent, or Firm—Frommer Lawrence & Haug LLP; William S. Frommer

(57) ABSTRACT

A digital signal multiplexing method and apparatus in which plural degree-one multiplexed streams produced on time-divisionally multiplexing a bitstream of one or more digital signals are received and are time-divisionally multiplexed to generate a degree two multiplexed stream. Specifically, plural degree-one multiplexed streams are received, and the received degree-one multiplexed streams are time-divisionally multiplexed based on a repetitive pattern associated with the bitrate of the respective degree-one multiplexed streams to generate a degree two multiplexed stream. The time reference value attached to the degree two multiplexed stream is corrected based on the reference clocks not synchronized with the system clocks of the degree-one multiplexed streams. A pre-set volume of the dummy data is multiplexed if the corrected time reference value becomes larger than the time reference value attached to the degree-one multiplexed streams.

31 Claims, 11 Drawing Sheets

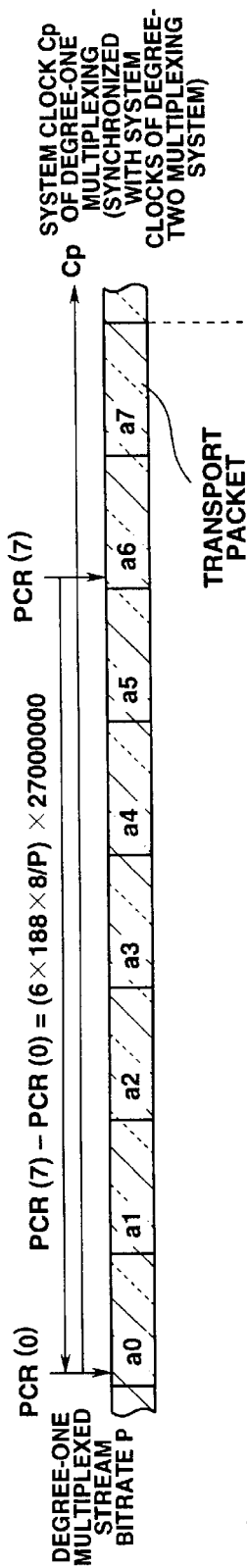
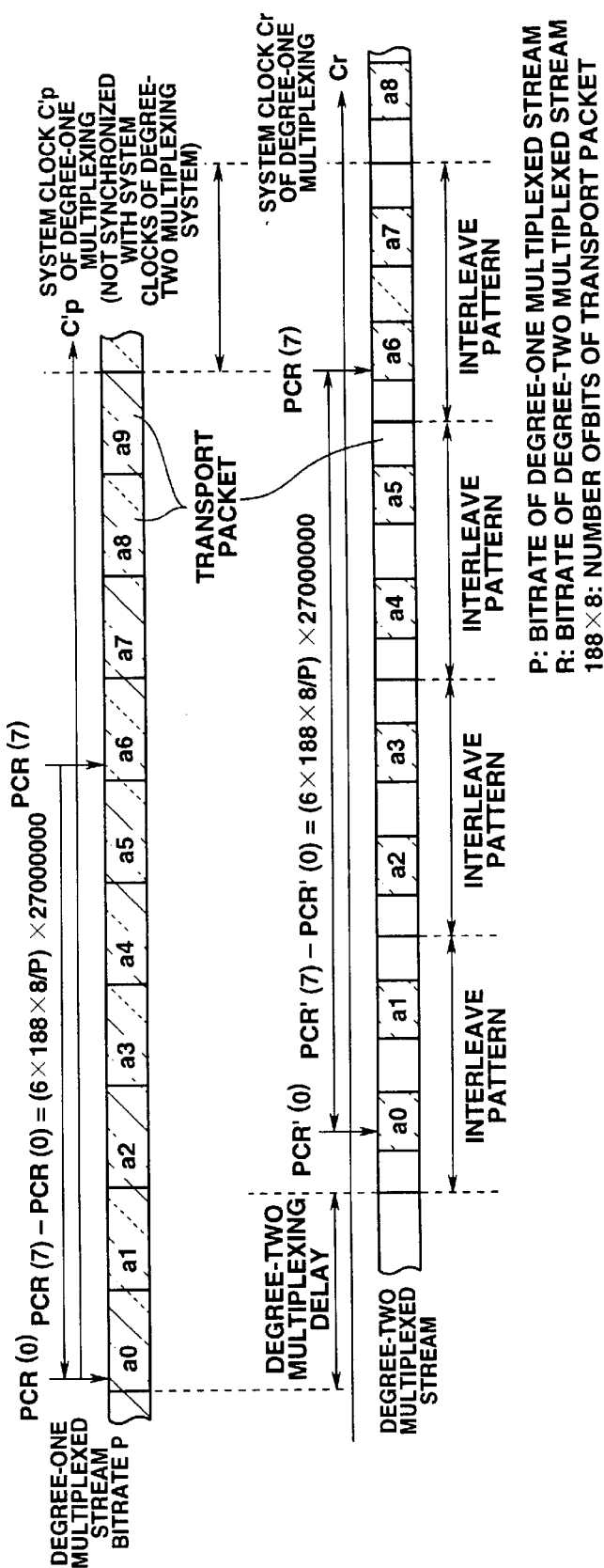
FIG.7A (RELATED ART) IN CASE OF SYNC SYSTEM (Cp = Cr)
FIG.7B (RELATED ART) IN CASE OF NON-SYNC SYSTEM (C'p > Cr)

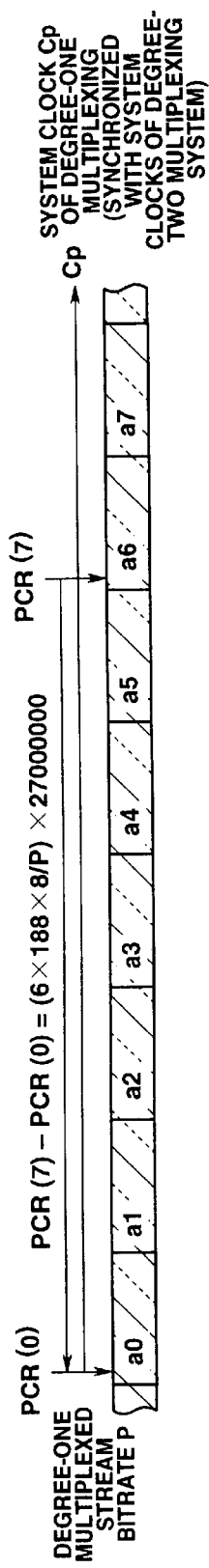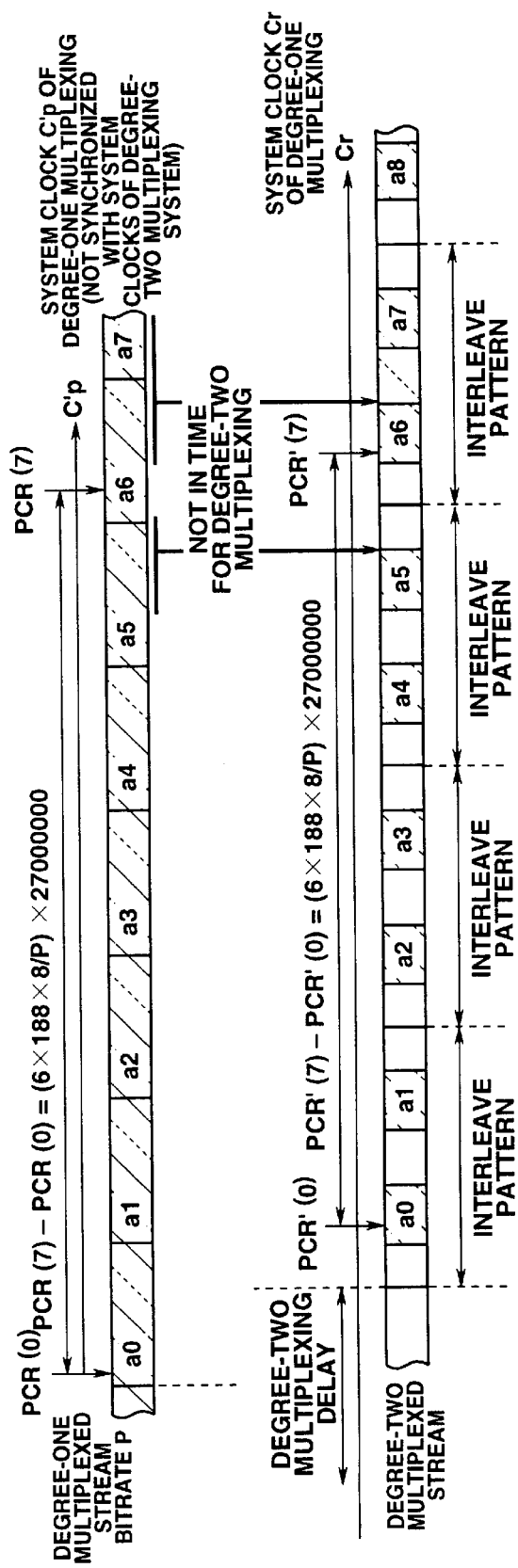

IN CASE OF SYNC SYSTEM (Cp = Cr)

IN CASE OF NON-SYNC SYSTEM

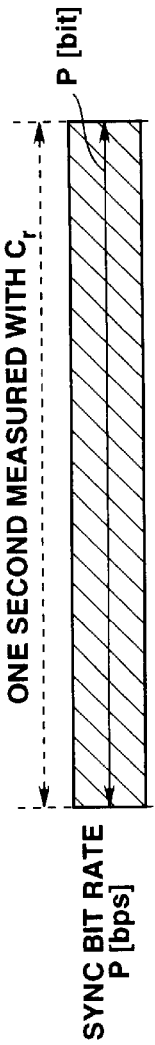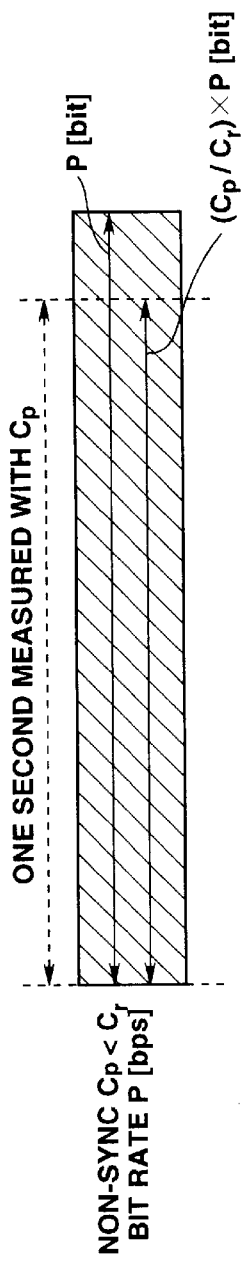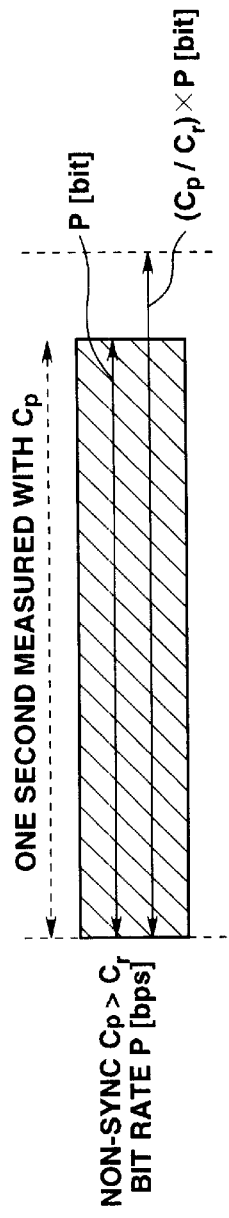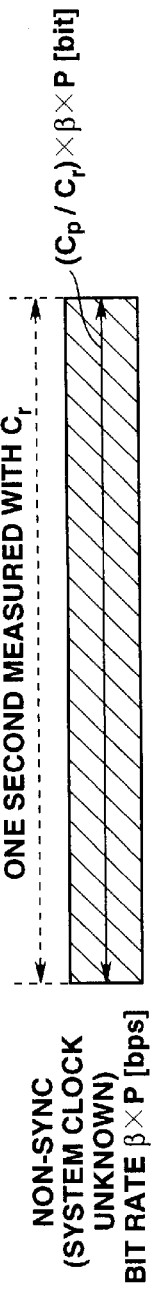
FIG.11A  SYNC BIT RATE P [bps]
FIG.11B  NON-SYNC $C_p < C_r$ BIT RATE P [bps]
FIG.11C  NON-SYNC $C_p > C_r$ BIT RATE P [bps]
FIG.11D  NON-SYNC (SYSTEM CLOCK UNKNOWN) BIT RATE $\beta \times P$ [bps]
$C_r$: SYSTEM CLOCK OF DEGREE-TWO MULTIPLEXER
$C_p$: SYSTEM CLOCK OF DEGREE-ONE MULTIPLEXER
P: RATE ALLOCATED TO DEGREE-ONE MULTIPLEXER

US 6,414,970 B1

DIGITAL SIGNAL MULTIPLEXING METHOD AND APPARATUS, DIGITAL SIGNAL TRANSMISSION METHOD AND APPARATUS, DIGITAL SIGNAL RECORDING METHOD AND APPARATUS AND RECORDING MEDIUM

BACKGROUND OF THE INVENTION

1. Field of the Invention

This invention relates to a signal multiplexing method and apparatus for multiplexing digital picture or speech signals to generate degree-one multiplexed television-program-based streams, degree-two multiplexing these plural degree-one multiplexed streams to generate a degree-two multiplexed stream to transmit or record the generated degree-two multiplexed stream, a digital signal transmission method and apparatus, a digital signal recording method and apparatus, and to a recording medium having the multiplexed data recorded thereon.

2. Description of the Related Art

In ISO13818-1, there is prescribed a transport stream for multiplexing plural programs, such as television broadcast programs, into a sole multiplexed stream, and transmitting the multiplexed stream. Up to now, there is known a multiplexing system for generating this transport stream.

FIG. 1 shows a structure of a broadcast system transmitting this transport stream using, for example, a digital broadcasting satellite.

To a transmitting device 101, base band video or audio data, associated with plural programs Pa to Pn, are sent from a server or a video camera. These video or audio data are sent to video encoders 102a to 102n and to audio encoders 103a to 103n, associated with the programs Pa to Pn, respectively, so as to be encoded to compressed data streams (elementary streams) conforming to, for example, MPEG (ISO/IEC11172, ISO133818).

The encoded elementary streams are sent to degree-one multiplexers 104a to 104n, associated with the programs Pa to Pn, respectively. The degree-one multiplexers 104a to 104n time-divisionally multiplex elementary streams, supplied on the program basis, in terms of the transport packets prescribed by ISO13818-1as unit, to generate degree-one multiplexed streams associated with the respective programs Pa to Pn.

The degree-one multiplexed streams, generated by the degree-one multiplexers 104a to 104n, are sent to a degree one multiplexer 105 which then time-divisionally multiplexes the degree-one multiplexed streams on the packet basis to generate a sole degree-two multiplexed stream.

This degree one multiplexer 105 sends the generated degree two multiplexed stream via the transmission medium to a reception device 111.

The degree-one multiplexed streams, generated by the degree-one multiplexers 104a to 104n, are sent to a degree-two multiplexer 105, which then time-divisionally multiplexes the respective degree-one multiplexed streams on the transport packet basis to generate a sole degree-two multiplexed stream.

The degree-two multiplexer 105 sends the generated degree-two multiplexed stream via a transmission medium 110 to a reception device 111.

The degree-one multiplexed streams and the degree-two multiplexed stream, obtained on multiplexing by the degree-one multiplexers 104a to 104n and the degree-two multiplexer 105, respectively, conform to the transport stream prescribed in ISO13818-1.

The transmission device 101 thus encodes the base-band video or audio data, associated with the programs Pa to Pn, to generate a sole degree-two multiplexed stream, which is sent to the reception device 111 via transmission medium 110.

The degree-two multiplexed stream is transmitted via the transmission medium 110 to the reception device 111. Specifically, the degree-two multiplexed stream is sent to a separator 112. The separator 112 separates only the elementary stream associated with the program specified by the viewer from the degree-two multiplexed stream to send the separated elementary stream to a decoder. That is, the separator 112 sends the video elementary stream of the specified program to a video decoder 113, while sending the audio elementary stream of the specified program to an audio decoder 114.

The video decoder 113 and the audio decoder 114 expand or decode the compressed or encoded data to generate baseband video and audio data which are sent to an external equipment, not shown.

The reception device 111 thus receives the supplied degree-two multiplexed stream to select the predetermined program from the plural programs contained in the degree-two multiplexed stream by way of decoding.

FIG. 2 shows data structures of the degree-one multiplexed streams and the degree-two multiplexed stream, as the transport stream prescribed by the ISO13818-1.

The video elementary streams, encoded by the video encoders 102a to 102n, and audio elementary streams, encoded by the audio encoders 103a to 103n, are split into packets termed PES packets. The associated degree-one multiplexers 104a to 104n split the elementary streams into fixed-length transport packets, each being of 188 bytes, and time-divisionally degree-one multiplex the elementary streams on the transport packet basis to generate degree-one multiplexed streams. The degree-two multiplexer 105 time-divisionally degree-two multiplexes the respective degree-one multiplexed streams on the transport packet basis to generate the degree-two multiplexed stream.

FIG. 3 shows a decoder model of the reception device 111 in case the transport stream prescribed by the above-mentioned ISO13818-1 is supplied thereto.

A splitter 112 selects only the transport packets associated with the program and which have been selected by the viewer from the degree-two multiplexed stream to distribute the selected packets to transport buffers 116 to 118. These transport buffers 116 to 118 transiently store the transport packets of the associated data. Specifically, the transport buffer 116 stores the transport packet of video data of the selected program, the transport buffer 117 stores the transport packet of audio data of the selected program and the transport buffer 118 stores the transport packet of program control data of the selected program. Although the transport buffer for title data etc is not shown, transport packets of title data, for example, if contained in the selected program, are stored in the associated transport buffers.

Each of the transport buffers 116 to 118 has a capacity of, for example, 512 bytes, and proceeds to leak the PES packets at a prescribed rate as long as data are stored therein.

The video data leaked from the transport buffer 116 is sent to a multiplexing buffer 119. The audio data and the program control data, leaked from the transport buffers 117, 118, are sent to associated elementary buffers 121, 122, respectively.

From the multiplexing buffer 119, only the elementary stream is leaked at a prescribed bitrate so as to be sent to the elementary buffer 120.

At each decoding time point, decoders 123 to 125 extract elementary streams from the associated elementary buffers 120, 121, 122, every decoding unit (termed an accessing unit) or every picture unit if the data is video data, in order to carry out decoding. The video data is decoded, using a re-order buffer 126, for chronologically displaying pictures. The base-band video and audio data and control data, thus decoded, are sent to an external equipment or to a system controller.

By the above-described model, the reception device 111 decodes the transport stream prescribed by the above-mentioned ISO13818-1.

In the above-described broadcast system, employing digital satellite broadcast, it is possible to transmit transport streams, obtained on multiplexing data compressed every plural programs by the transmitting device 101, and to demultiplex and decode the data by the reception device 111.

Meanwhile, the total size of the multiplexing buffer 119 and the elementary buffer 120 (121, 122) is the sum of the buffer size of the video buffering verifier (VBV) for controlling the amount of the generated codes and a size uniquely determined by the profile and the level prescribed in ISO13818-2. This sum is referred to hereinafter as a decoder buffer. Thus, each encoder of the transmitting device 101 controls the amount of the generated codes so as to prevent underflow or overflow of the decoder buffer, that is so as not to cause failure of the decoder buffer. The degree-one multiplexers 104a to 104n similarly perform scheduling and multiplexing such as to evade underflow or overflow of the decoder buffer.

Meanwhile, in a multiplexing system used in the above-described broadcast system, that is in a multiplexing system in which degree-one multiplexed streams are further multiplexed to produce a sole degree-two multiplexed stream, there is produced, for the following reason, a time deviation between an output timing of the degree-one multiplexed streams, scheduled by the degree-one multiplexers, and an output timing of the degree-one multiplexed streams multiplexed into the degree-two multiplexed stream.

Specifically, there is produced, in this degree-two multiplexing system, a time deviation between respective output timings of the degree-one multiplexed streams multiplexed into the degree-two multiplexed stream due to the facts that degree-two multiplexing is possible only in transport-packet-based time slots in the bitrate of the degree-two multiplexed stream, the bitrate of the degree-two multiplexed stream is higher than that of the degree-one multiplexed streams, and that, since it is only the transport packet of a sole degree-one multiplexed stream that can be degree-two multiplexed into a given time slot, the transport packet of the degree-one multiplexed stream outputted by the degree-one multiplexer substantially simultaneously is kept in a waiting state. This time deviation between the output timings of the degree-one multiplexed streams scheduled by the respective degree-one multiplexers and the output timings of the degree-one multiplexed streams multiplexed into the degree-two multiplexed stream is termed a degree-two multiplexing jitter.

Thus, even if, in the multiplexing system, the respective degree-one multiplexers are scheduled for multiplexing so as not to cause failure of the decoder buffer provided upstream of the decoder, the decoder buffer is susceptible to failure under tie effect of deviation caused by the degree-two multiplexing jitter in tie arrival timing of the data stream at the decoder buffer or under the effect of deviation in the time reference encoded in the degree-two multiplexed stream or in the program check reference (PCR) in the case of the transport stream prescribed in ISO13818-1.

These two effects in the multiplexing system are scrutinized in more detail.

Referring first to FIGS. 4A to 4D, the deviation in the arrival timing of the data stream at the decoder buffer due to degree-two multiplexing jitter is explained. Meanwhile, FIGS. 4A to 4D illustrate a degree-one multiplexed stream of a predetermined program into which are multiplexed a video elementary stream and an audio elementary stream, a degree-two multiplexed stream into which are multiplexed the above-mentioned predetermined program and other programs, the buffer occupation volume of the decoder buffer envisaged by the degree-one multiplexers and the buffer occupation volume of the decoder buffer corrupted with the degree-two multiplexing jitter, respectively.

The degree-one multiplexed stream is video or audio data multiplexed every transport packet (N, N+1, N+2, N+3, ...) constituted by the packet header and the elementary stream, as shown in FIG. 4A.

The degree-two multiplexed stream is composed of degree-one multiplexed streams shown in FIG. 4A and other degree-one multiplexed streams, degree-two multiplexed at a bitrate higher than the bitrate of the degree-one multiplexed streams, as shown in FIG. 4B.

It is noted that the degree-one multiplexed streams are scheduled and multiplexed so as not to produce overflow or underflow in the decoder buffer. Thus, the video data contained in the pre-set transport packet, such as the transport packet N+1, is decoded without causing failure of the decoder buffer, while audio data contained in the pre-set transport packet, such as the transport packet N+3, is also decoded without causing failure of the decoder buffer, as shown in FIG. 4C.

However, since the degree-two multiplexed stream is of a bitrate higher than the degree-one multiplexed streams, the packet data storage end timing of the degree-two multiplexed stream is occasionally earlier than that of the degree-one multiplexed streams, even if the input start timing of the transport packet into the decoder buffer in the degree-two multiplexed stream is the same as that in the degree-one multiplexed streams. The result is that the end timing of packet data storage into the decoder buffer becomes faster than the timing envisaged by the degree-one multiplexers. Thus, the end timing of packet data storage in the decoder buffer becomes faster than the timing envisaged by the degree-one multiplexers. In such transport packet, such as transport packet N+1, the buffer occupation volume exceeds the decoder buffer size to produce overflow, as shown in FIG. 4D.

Also, since the degree-two multiplexed stream is corrupted with the degree-two multiplexing jitter, the transport packet input start timing to the decoder buffer is occasionally later than that in the degree-one multiplexed streams, such that the packet data storage start timing to the decoder buffer is later than the timing envisaged by the degree-one multiplexed streams. In such transport packet, such as transport packet N+3, the buffer occupation volume is smaller than zero, as shown in FIG. 4D, thus producing the underflow.

Next, the description is made of the deviation produced in the time reference value (PCR) encoded in the degree-two multiplexed stream due to the degree-two multiplexing jitter.

The PCR is encoded into the packet header of a predetermined transport packet, as shown in FIG. 4A. This PCR denotes the data input time to a decoder. The decoder of the reception device is actuated in synchronism with system clocks of the reception device based on the actual input timing of byte data including the last bit of the PCR base field and on the PCR value. That is, both the value itself of the PCR and the arrival timing of the PCR at the decoder, that is the timing of actual output timing of the multiplexer, are meaningful. Therefore, if degree-two multiplexing jitter is produced in the transport packet, into which is encoded the PCR, such as the transport packet N+2 shown in FIG. 4, there is produced time deviation between the PCR output timing and the value of the PCR shown in FIG. 4B, such that synchronization cannot be achieved in the decoder. The ISO13138-1 provides that only the PCR deviation up to ±500 nanosecond is allowable.

Thus, in the conventional multiplexing system, the following processing is generally adopted in order to overcome the inconveniences of deviation in data stream arrival timing at the decoder buffer and of deviation of the time reference PCR encoded in the degree-two multiplexed stream.

That is, in the conventional multiplexing system, an imaginary buffer occupation volume of the decoder buffer is presumed, in generating the degree-one multiplexed streams by the degree-one multiplexers, and a pre-set margin is provided for each of the upper and lower values of the buffer occupation volume of the decoder buffer in order to effect multiplexing. The result is that, in the conventional multiplexing system, such a degree-two multiplexed stream is produced which does not produce failure in the decoder buffer even if the data stream arrival timing at the decoder buffer is earlier or later due to the degree-two multiplexing jitter. Also, in the conventional multiplexing system, a PCR correction unit for correcting the PCR of the degree-two multiplexed stream is provided downstream of the degree-two multiplexer. The result is that if, in the conventional multiplexing system, the PCR is deviated due to the degree-two multiplexing jitter, such a degree-two multiplexed stream can be realized which enables synchronization to be achieved at the decoder of the reception device.

Referring to FIG. 5, a conventional multiplexing system 150 which overcomes these two problems is explained.

The conventional multiplexing system 150 includes plural degree-one multiplexers 151a to 151n and a degree-two multiplexer 152. This degree-two multiplexer 152 is made up of reception memories 153a to 153n, associated with the degree-one multiplexers 151a to 151n, respectively, a switching unit 154 for switching between the degree-one multiplexed streams stored in the reception memories 153a to 153n to multiplex the selected degree-one multiplexed streams, a time information correction unit 155 for correcting the PCR of the degree-two multiplexed stream generated by the switching unit 154, and a clock generator 156 for generating system clocks of the degree-two multiplexer 152.

In this multiplexing system 150, the system clocks accorded to the degree-one multiplexers 151 a to 151n are synchronized with the system clocks generated by the clock generator 156 so that time management is achieved by the same clocks.

The degree-one multiplexers 151a to 151n provide a pre-set margin for each of the upper and lower values of the buffer occupation volume of the data buffer to generate degree-one multiplexed streams of code volumes which do not cause the failure of the decoder buffer. The degree-one multiplexed streams are sent to the associated reception memories 153a to 153n.

The reception memories 153a to 153n transiently store the degree-one multiplexed streams generated by the degree-one multiplexers 151a to 151n.

The switching unit 154 is responsive to a repetitive pattern of transport packets repeated at a pre-set period, referred to hereinafter as an interleaving pattern, to select the degree-one multiplexed streams stored in reception memories 153a to 153n. This switching unit 154 multiplexes the selected transport packets to generate a degree-two multiplexed stream.

The time information correction unit 155 rewrites the value of the PCR of the degree-two multiplexed stream generated by the switching unit 154 to the actual outputting timing of the degree-two multiplexer 150.

The clock generator 156 generates system clocks of the degree-two multiplexer 152. Therefore, the degree-two multiplexed stream, generated by the degree-two multiplexer 152, is synchronized with system clocks generated by the clock generator 156. FIG. 6 shows an instance in which two degree-one multiplexed streams with bitrates of 6 Mbps and 4 Mbps are multiplexed by the conventional multiplexing system 150 to a sole degree-two multiplexed stream having a bitrate of 10 Mbps.

The degree-two multiplexed stream is multiplexed in accordance with a pre-set interleaving pattern with a delay of a pre-set degree-two multiplexing delay relative to the degree-one multiplexed streams. This interleaving pattern is made up of five transport packets, namely three transport packets of the degree-one multiplexed streams having a bitrate of 6 Mbps and two transport packets of the degree-one multiplexed streams having a bitrate of 4 Mbps. In this degree-two multiplexed stream, since the degree-two multiplexing jitter is not zero for the totality of the transport packets, the PCR value encoded in the degree-one multiplexed streams is rewritten by the time information correction unit 155 to the correct value of PCR at an output timing of the degree-two multiplexer. In addition, the respective degree-one multiplexed streams and the degree-two multiplexed stream are generated on the basis of the system clocks synchronized with each other, so that, for example, the interleaving pattern time width are the same for the degree-one multiplexed streams and the degree-two multiplexed stream.

With the conventional multiplexing system 150, described above, the bitstream is multiplexed with pre-set margin by the respective degree-one multiplexers 151a to In to prevent failure of the decoder buffer. In addition, the PCR value is written by the time information correction unit 156 to generate the degree-two multiplexed stream for which the decoder buffer failure is not caused and for which synchronization with the transmission device can be achieved on the side of the decoder.

Meanwhile, if, in an asynchronous system in which system clocks for actuating the degree-one multiplexers 151a to 151n and those for actuating the degree-two multiplexer 152 are not synchronized with each other, the degree-two multiplexed stream is generated in accordance with the interleaving pattern, as described above, there is produced timing deviation in the degree-two multiplexing due to the difference in the system clocks, in addition tot the multiplexing jitter generated in the synchronization system.

The problem caused by timing deviation in the degree-two multiplexing due to difference in the system clocks produced in an asynchronous multiplexing system doing the processing of the degree-one multiplexing and that of the degree-two multiplexing asynchronously is hereinafter explained.

First, an instance in which the system clocks Cp' of the degree-one multiplexers is faster than the system clock Cr of the degree-two multiplexer is explained with reference to FIG. 7A showing degree-one multiplexed streams with the synchronous system (Cp=Cr) and to FIG. 7B. Meanwhile, the system clocks for degree-one multiplexing of the synchronous system and those for degree-one multiplexing of the asynchronous system are denoted as Cp and Cp', respectively.

The degree-one multiplexers output degree-one multiplexed streams of the bitrate P based on the system clocks Cp'. The degree-two multiplexer multiplexes the degree-one multiplexed streams of the bitrate P in accordance with the interleaving pattern to generate a degree two multiplexed stream. It is noted that, if system clocks Cp of the degree-one multiplexers are synchronized with the system clocks Cr of the degree-two multiplexer, the degree-two multiplexing jitter is produced, as shown in FIG. 7A, however, the transport packets of the degree-one multiplexed streams, generated every interleaving pattern, are degree-two multiplexed in the interleaving patterns, such that there is produced no deviation in the degree-two multiplexing timing due to the difference in the system clocks. However, in the asynchronous multiplexing system in which the system clocks Cp' of the degree-one multiplexers are faster than the system clocks Cr of the degree-two multiplexer, more data of the degree-one multiplexers than are degree-two multiplexed in accordance with the interleaving pattern are produced, as shown in FIG. 7B. For example, two more transport packets a8, a9 are generated in the degree-one multiplexed streams at a time point when the degree-two multiplexing of the four interleaving patterns has come to a close, as shown in FIG. 7B. The transport packets a8, a9, thus produced, are accumulated at this point in the reception memories. Thus, if degree-two multiplexing timing deviation is produced due to difference in the system clocks, the data which has failed to be degree-two multiplexed are accumulated in the reception memories, in a manner distinct from the degree-two multiplexing jitter in the above-described synchronous system, thus causing overflow of the reception memories.

If such deviation in the degree-two multiplexing jitter due to the difference in the system clocks is produced, the degree-two multiplexer is compelled to correct the PCR as it accumulates the deviation time. The result is that the difference between the PCR encoded by the degree-one multiplexers and the PCR' corrected by the degree-two multiplexer keeps on to be increased. That is, since the value of the PCR corrected by the degree-two multiplexer keeps on to be increased despite the fact that the degree-one multiplexers have presupposed this decoding buffer in scheduling in order to encode the PCR, it becomes impossible to maintain correct matching with respect to the decoding time prescribed every decoding unit such as in a video frame such that the decoder buffer of the reception side undergoes over flowing or underflowing.

Referring to FIGS. 8A and 8B, the case in which the system clocks Cp' are slower than the system clocks Cr of the degree-two multiplexer. FIGS. 8a and 8b show degree-two one multiplexers of the synchronous system (Cp=Cr) and degree-one multiplexed streams and a degree two multiplexed stream of the asynchronous system (Cp'<Cr), respectively.

The degree-one multiplexers output a degree-one multiplexed streams of a bitrate P based on the system clocks Cp'. The degree-two multiplexer multiplexes the degree-one multiplexed streams of the bitrate P in accordance with the interleaving pattern to generate a degree-two multiplexer. It is noted that, if the system clocks Cp of the degree-one multiplexers are synchronized with the system clocks Cr of the degree-two multiplexer, degree-two multiplexing jitter is produced, as shown in FIG. 8A, however, the transport packets of the degree-one multiplexed streams generated every interleaving pattern are degree-two multiplexed in the interleaving patterns, such that deviation in the degree-two multiplexing timing due to the difference in the system clocks is not produced.

However, in an asynchronous multiplexing system in which the system clocks Cp' of the degree-one multiplexers are slower than the system clocks Cr of the degree-two multiplexer, as shown in FIG. 8B, data of the degree-one multiplexed streams are generated at a rate slower than the rate of degree-two multiplexing in accordance with the interleaving pattern. For example, data for degree-two multiplexing are not generated as from a mid point of the transport packet a5, as shown in FIG. 8B, such that degree-two multiplexing cannot be achieved in accordance with the interleaving pattern. Therefore, the deviation in the degree-two multiplexing due to the difference in the system clocks is such that data of the degree-one multiplexed streams cannot reach the reception memories at the degree-two multiplexing timing, in a manner distinct from the degree-two multiplexing jitter in the above-described synchronous system, thus ultimately causing underflow of the reception memories.

If the difference in the degree-two multiplexing timing due to the difference in the system clocks is produced, the degree-two multiplexer has to correct the PCR as it accumulates the deviation time. Thus, the difference between the PCR encoded by the degree-one multiplexers and the PCR' corrected by the degree-two multiplexer keeps on to be increased. The result is that the value of the PCR corrected by the degree-two multiplexer keeps on to be increased even although the degree-one multiplexers presuppose the decoder buffer to effect the scheduling to encode the PCR, so that matching to the decoding time provided each decoding unit as in a video frame or to the other time information appended to the stream cannot be maintained to cause the overflow or the underflow of the reception side decoding buffer.

Up to now, the system clocks Cp of the degree-one multiplexers is generally synchronized with the video frame timing (V sync), while the system clocks Cr of the degree-two multiplexer are the send-out clocks of the degree two multiplexed stream and generally depend on the transmission medium. Moreover, in a conventional broadcasting station, expensive equipments are used, such that the system clocks Cp of the totality of the degree-one multiplexers can be easily synchronized with the system clocks Cr of the degree-two multiplexer. However, in keeping up with the increased number of channels of the digital television broadcast, coming into widespread use of the personal computers and with the increased frequency bandwidth of the household network, there is raised a demand for constructing a multiplexing system by a simpler system configuration and for a multiplexing system operating satisfactorily even if the degree-one multiplexers are not synchronized with the degree-two multiplexer.

Moreover, if the system clocks Cp of all of the degree-one multiplexers are to be restored by the degree-two multiplexer, a number of PLLs equal to the number of the degree-one multiplexers is required. Moreover, for keeping the PLL in operating state, the degree-one multiplexed streams need to be transferred in real-time. If, for example, the transfer to the reception memories and arrival of the PCR are delayed, the PLLs restore the clocks slower than the system clocks Cp of the degree-one multiplexers. Therefore, transfer of the degree-one multiplexed stream data from the degree-one multiplexers to the reception memories needs to use a dedicated transfer system which assures transfer in real-time. However, the pre-existing buses, such as peripheral component interconnect (PCI), a transfer bus preferentially used in a personal computer etc, transfer the data in a burst-like fashion. Thus, a demand is raised for an asynchronous system that is able to use the burst-like data transfer.

SUMMARY OF THE INVENTION

It is therefore an object of the present invention to provide a signal multiplexing method and apparatus, a digital signal transmission method and apparatus, a digital signal recording method and apparatus and a recording medium having the multiplexed data recorded thereon, in which the degree-one multiplexed streams can be multiplexed without disrupting the processing carried out on the reception or decoding sides.

With the digital signal multiplexing method and apparatus according to the present invention, degree-one multiplexed streams, obtained on time-divisionally multiplexing a bitstream of one or more digital signals and to which is attached a time reference value, are received from plural degree-one multiplexers. The received degree-one multiplexed streams are time-divisionally multiplexed, based on a repetitive pattern associated with the bitstream of each degree-one multiplexed stream, to generate a degree two multiplexed stream. The time reference value attached to the degree two multiplexed stream is corrected based on reference clocks not synchronized with reference clocks adapted for operating the degree-one multiplexers. If the corrected time reference value is larger than the time reference value attached to the degree-one multiplexed stream by more than a predetermined value, the pre-set volume of the dummy data is multiplexed.

With the present digital signal multiplexing method, the pre-set volume of the dummy data is multiplexed if the corrected time reference value becomes larger by more than a pre-set value than the time reference value attached by the degree-one multiplexers to the degree-one multiplexed streams, such that there is generated a degree two multiplexed stream to which is attached the corrected time reference value which is not larger by more than the pre-set value than the time reference value attached by the degree-one multiplexers to the degree-one multiplexed streams.

BRIEF DESCRIPTION OF THE DRAWINGS

FIGS. 7A and 7B illustrate a degree two multiplexed stream generated in a case wherein the system clocks of the degree-one multiplexers are faster than the system clocks of the degree-two multiplexer.

FIGS. 8A and 8B illustrate a degree two multiplexed stream generated in a case wherein the system clocks of the degree-one multiplexers are slower than the system clocks of the degree-two multiplexer.

FIGS. 11A to 11D illustrate the bitrate of the degree-one multiplexed streams outputted by the degree-one multiplexers of the multiplexing system.

DESCRIPTION OF THE PREFERRED EMBODIMENTS

Figure 1:
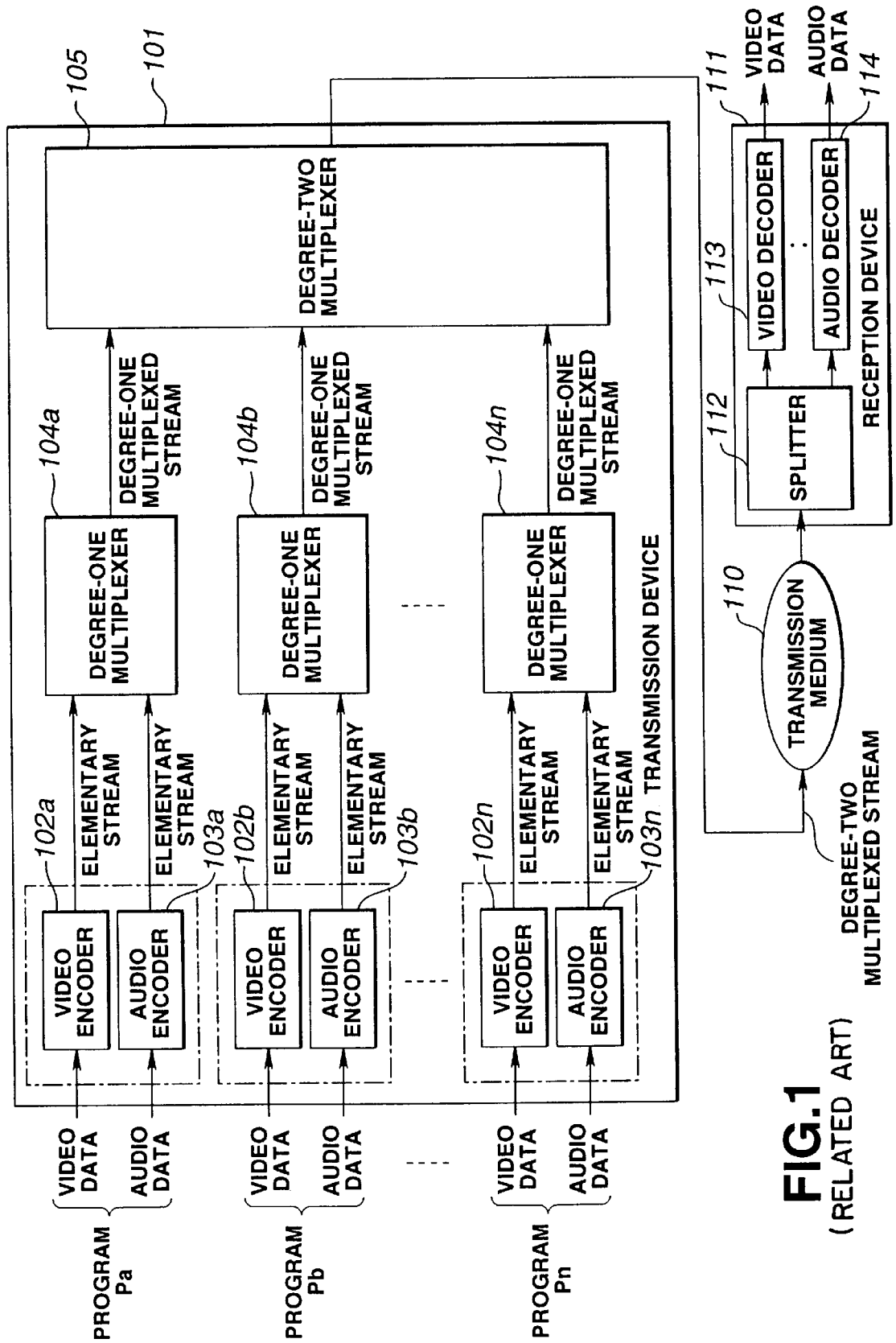
FIG. 1 is a block diagram showing a broadcast system for transmitting a transport stream used in a digital satellite broadcasting.
Figure 2:
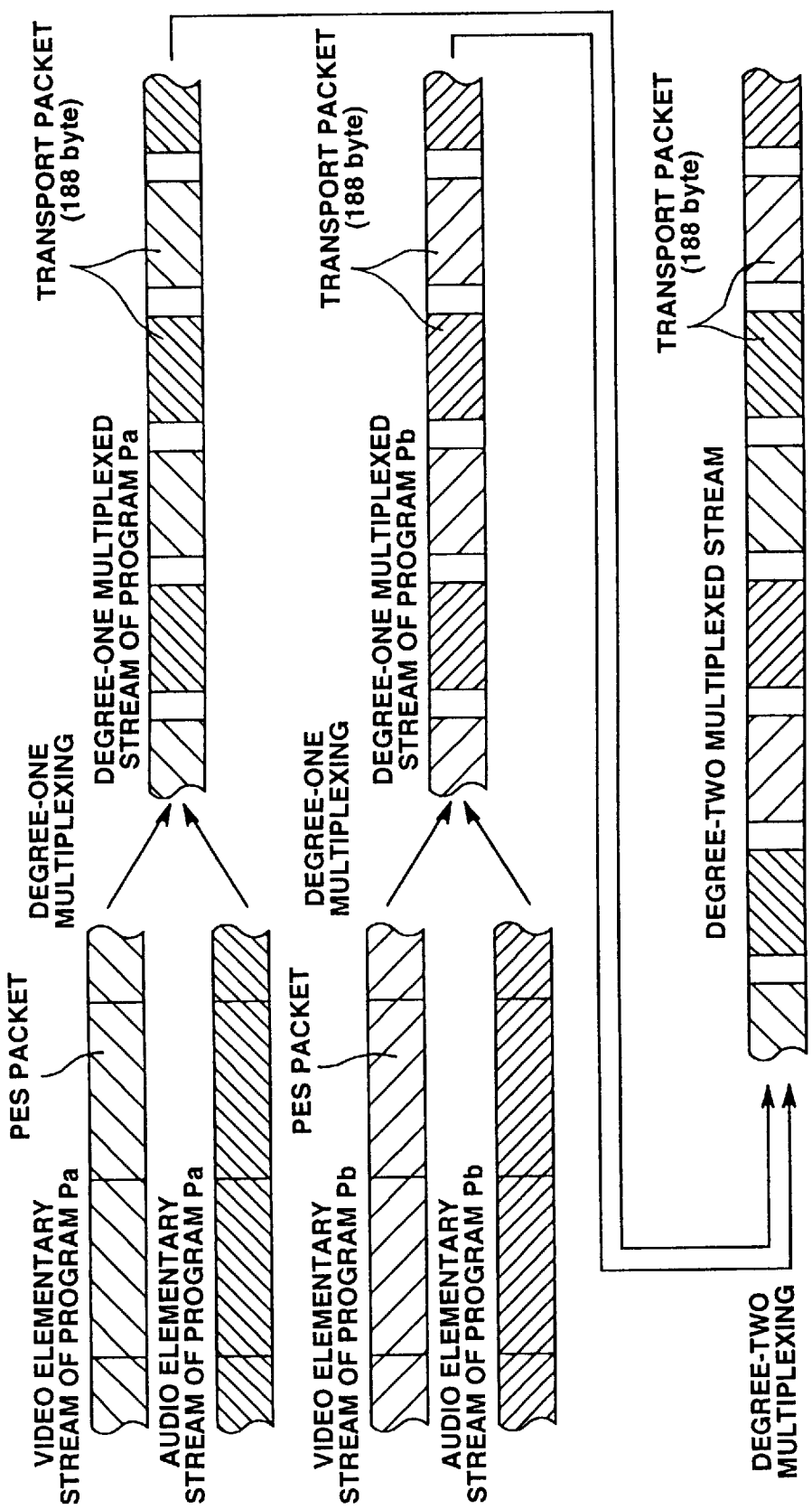
FIG. 2 shows a data structure of degree-one multiplexed streams, as transport streams prescribed by the ISO13818-1, and a degree-two multiplexed stream.
Figure 3:
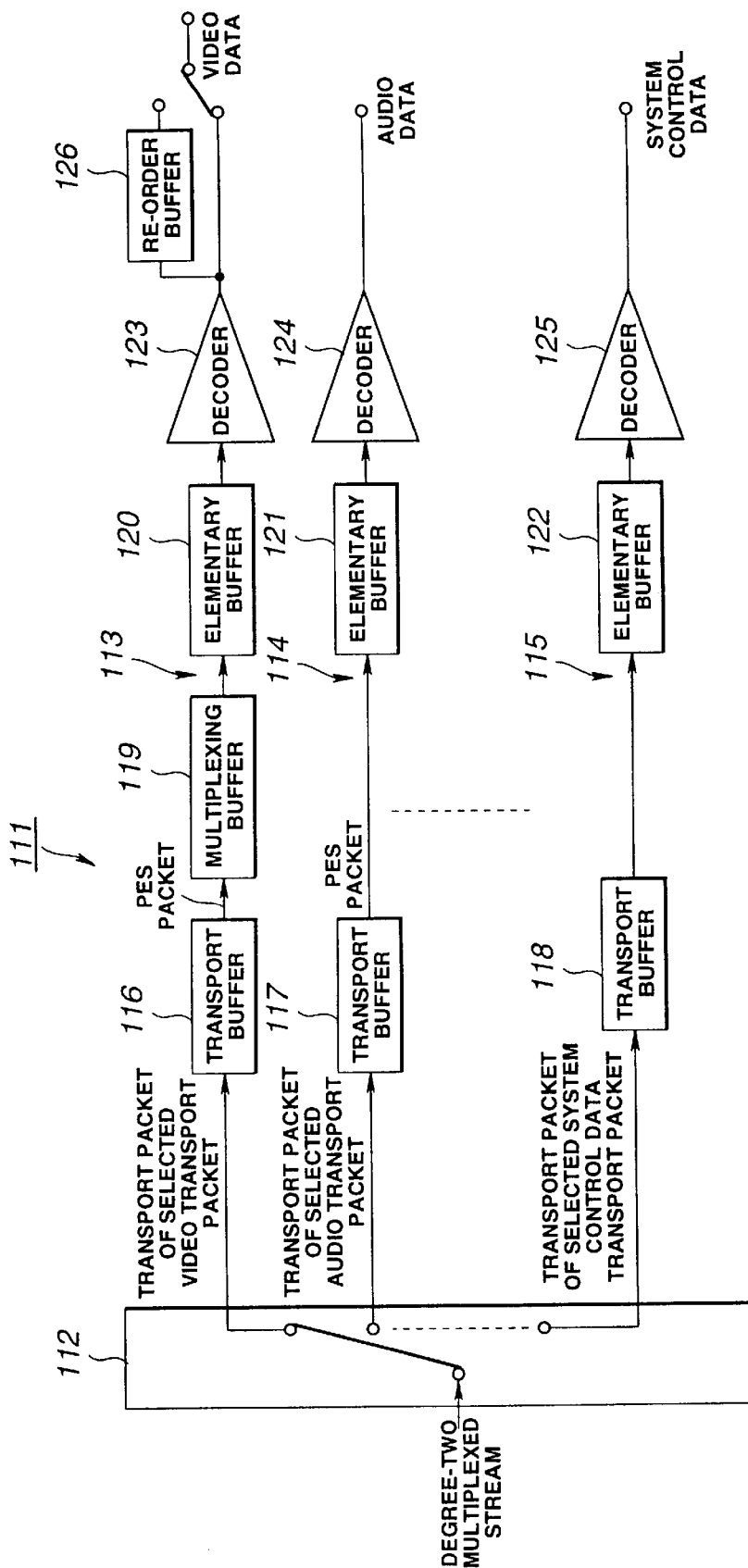
FIG. 3 is a block diagram for illustrating a decoder model of the broadcasting system.
Figure 4:
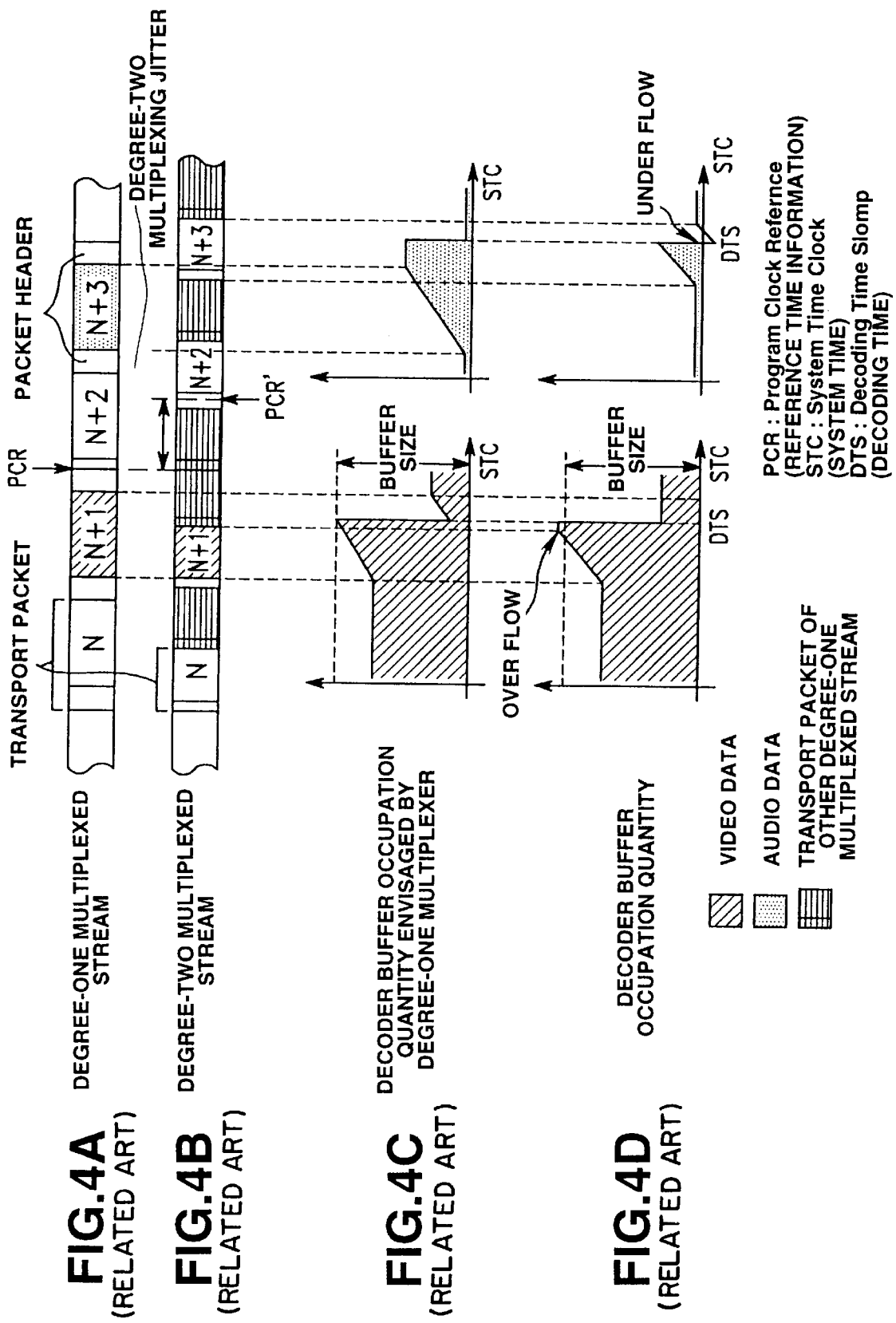
FIGS. 4A to 4D illustrate data structures of the degree-one multiplexed streams and the degree-two multiplexed stream and the buffer occupation volume of a decoder buffer for illustrating the problem due to the effect of the degree-two multiplexing jitter.
Figure 5:
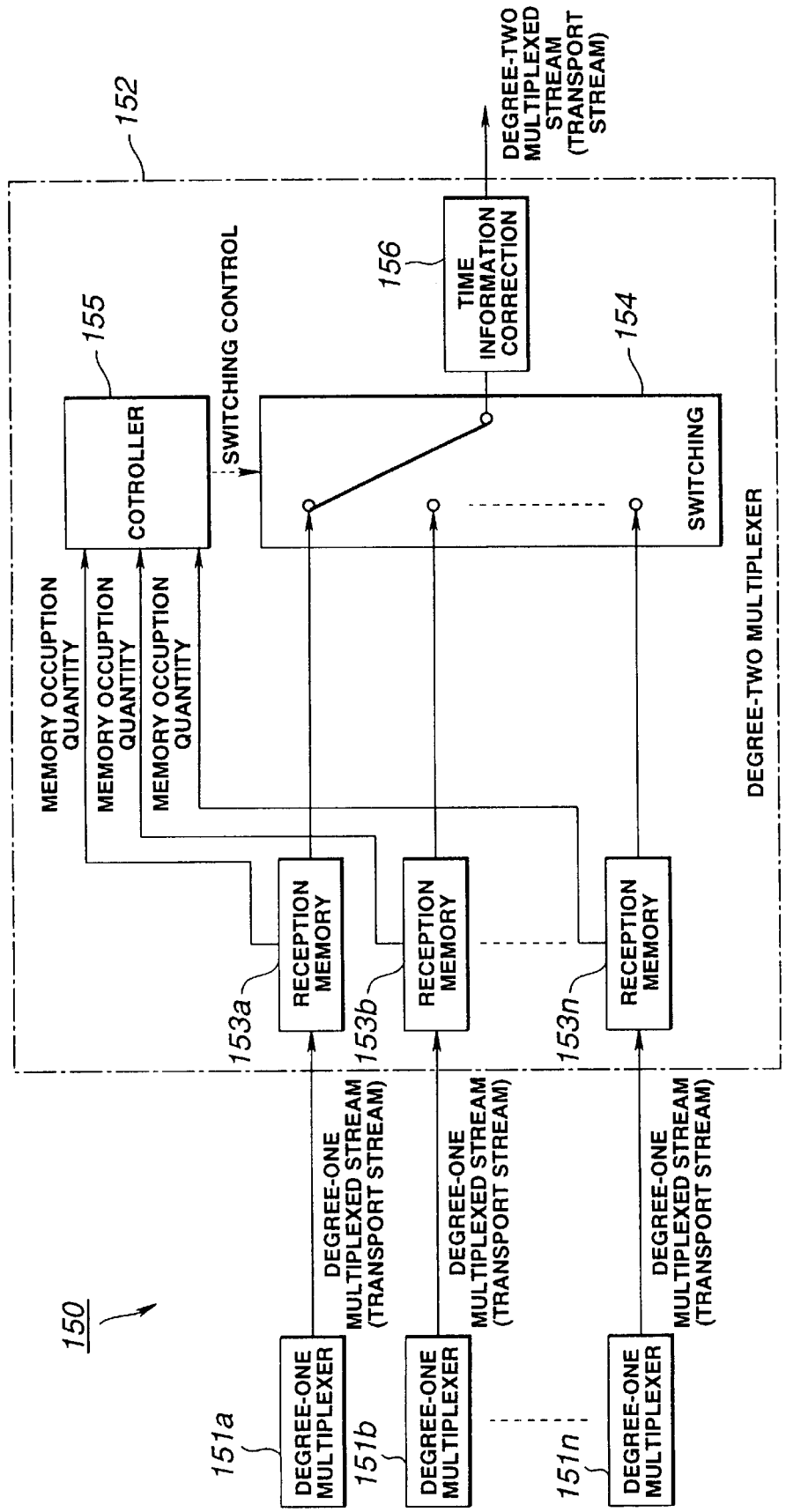
FIG. 5 is a block diagram showing a conventional multiplexing system.
Figure 6:
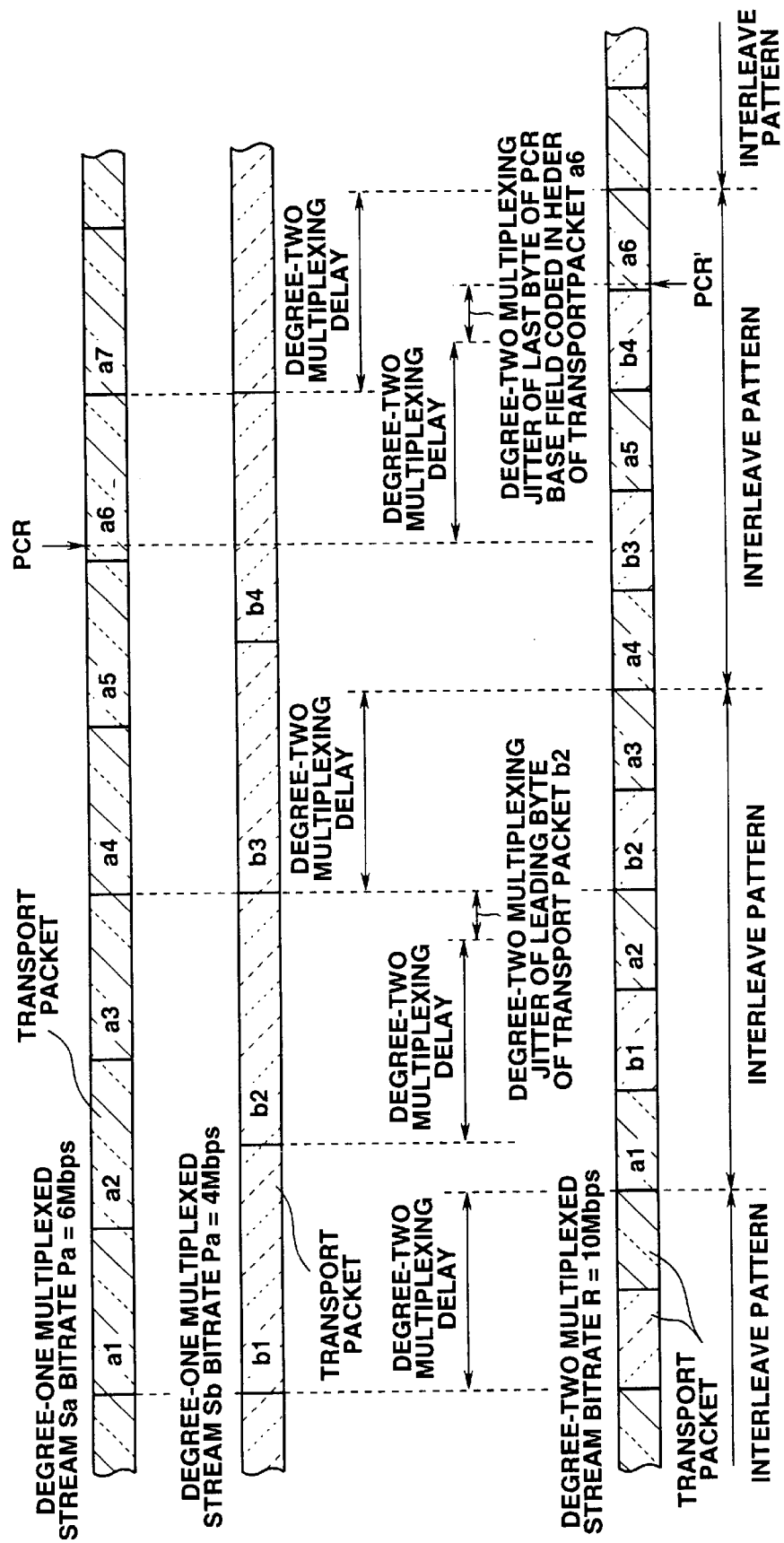
FIG. 6 illustrates a degree two multiplexed stream generated by the conventional multiplexing system.

Referring to the drawings, preferred embodiments of the multiplexing system according to the present invention will be explained in detail.

This multiplexing system is applied to a digital satellite broadcast system of transmitting a transport stream made up of data multiplexed in terms of plural programs, such as television broadcast programs or channels, as a unit, and to a recording system for recording the transport stream on a recording medium. This multiplexing system is such a system in which plural degree-one multiplexed streams obtained on time-divisionally multiplexing compressed audio or video data streams, that is elementary streams, are further time-divisionally multiplexed to produce a sole degree-two multiplexed stream usable by a sole transponder. Here, data contained in the degree-one multiplexed streams are equivalent to the sole channel or program of the above-mentioned television broadcast. Meanwhile, in the following explanation, the degree-one multiplexed streams and the degree-two multiplexed stream are assumed to be data streams corresponding to the transport streams prescribed in ISO13818-1.

First, a multiplexing system according to a first embodiment of the present invention is explained with reference to the drawings.

Figure 9:
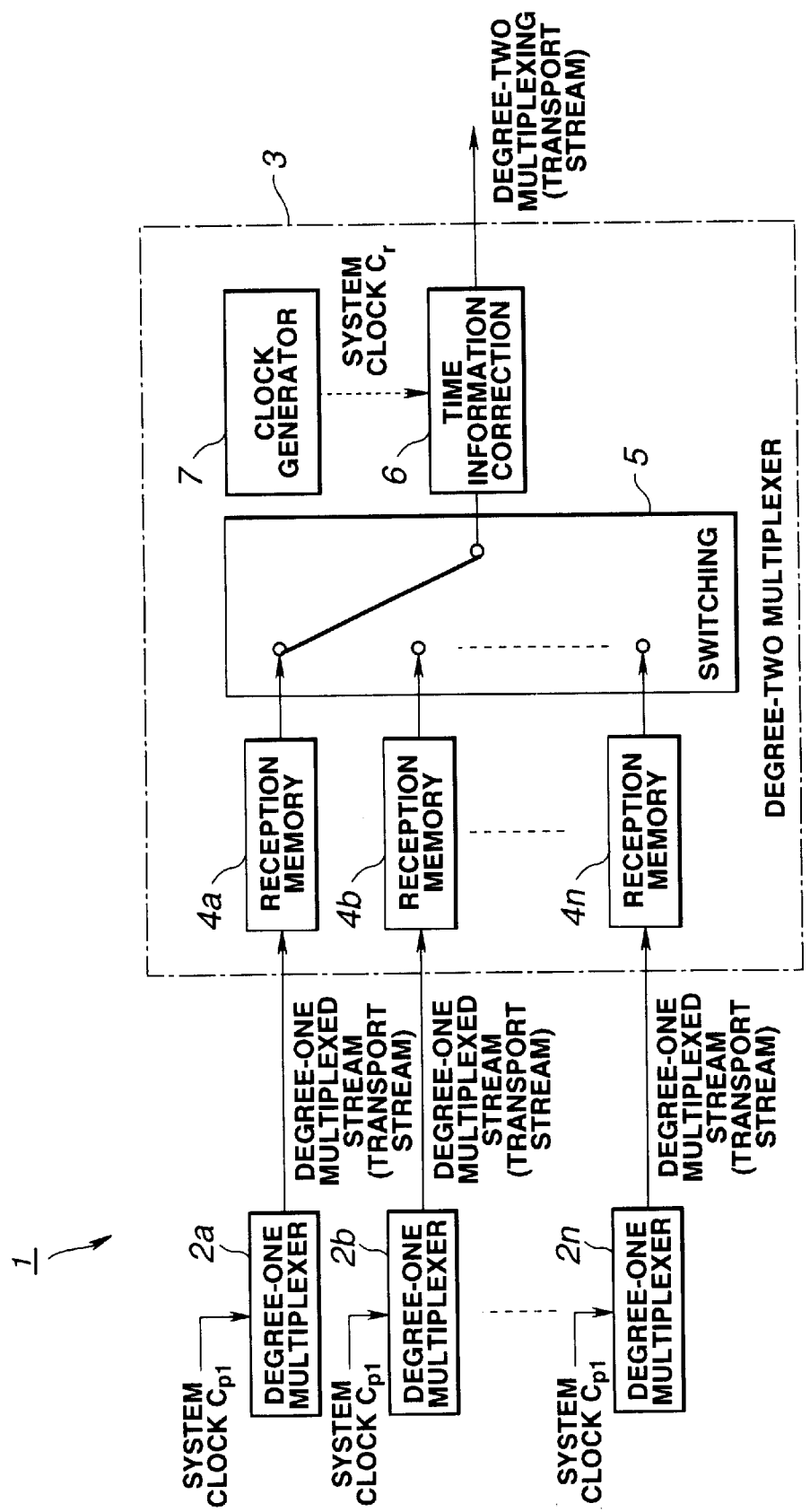
FIG. 9 is a block diagram of a multiplexing system embodying the present invention.

FIG. 9 shows the block diagram of the multiplexing system according to a first embodiment of the present invention.

The multiplexing system 1 includes plural degree-one multiplexers 2a to 2n, for generating degree-one multiplexed streams, and a degree-two multiplexer 3 for further multiplexing the degree-one multiplexed streams generated by the degree-one multiplexers 2a to 2n to generate a degree-two multiplexed stream. The degree-two multiplexer 3 includes plural reception memories 4a to 4n for receiving the degree-one multiplexed streams generated by the degree-one multiplexers 2a to 2n to store the received streams transiently, and a switching unit 5 for selecting the degree-one multiplexed streams stored in the reception memories 4a to 4n to degree two multiplex the selected degree-one multiplexed streams. The degree-two multiplexer 3 also includes a time information correction unit 6 for correcting the PCR of the degree-two multiplexed stream generated by the switching unit 5 and a clock generator 7 for generating system clocks for the degree-two multiplexer 3.

In this multiplexing system 1, the system clocks Cp1 to Cpn, accorded to the degree-one multiplexers 2a to 2n, respectively, and system clocks Cr, generated by the clock generator 7, are not synchronized with one another, such that time management is performed independently for the degree-one multiplexers 2a to 2n and the degree-two multiplexer 3.

The respective degree-one multiplexers 2a to 2n provide pre-set margins to upper and lower limit values of the buffer occupation volume of the decoder buffer in order to generate degree-one multiplexed streams of such code volumes as not to cause failure of the decoder buffer. The respective degree-one multiplexed streams are sent to associated reception memories 4a to 4n. Meanwhile, the degree-one multiplexers 2a to 2n operate on the basis of respective independent system clocks Cp1 to Cpn, so that the degree-one multiplexed streams generated by these degree-one multiplexers 2a to 2n are synchronized with the system clocks Cp1 to Cpn.

The reception memories 4a to 4n transiently store the degree-one multiplexed streams generated by the degree-one multiplexers 2a to 2n.

The switching unit 5 is responsive to the transport packet repetition pattern, determined by the bitrate of each degree-one multiplexed stream and which is repeated at a pre-set period (referred to hereinafter as an interleaving pattern), to select the degree-one multiplexed streams stored in the reception memories 4a to 4n. The switching unit 5 multiplexes the selected transport packet to generate the degree two multiplexed stream.

The time information correction unit 6 rewrites the values of the PCR of the degree two multiplexed stream generated by the switching unit 5 to correct values in order to correct the PCR value. That is, the time information correction unit 6 rewrites the value of the PCR encoded in accordance with the outputting timing of the degree-one multiplexed streams from the respective degree-one multiplexers 2a to 2n (PCR) to the value of the PCR matched to the outputting timing of the degree two multiplexed stream from the degree-two multiplexer 3 (PCR').

The clock generator 7 generates the system clocks Cr of the degree-two multiplexer 3, so that the degree two multiplexed stream generated by the degree-two multiplexer 3 are synchronized with the system clocks Cr generated by the clock generator 7. The values of the PCR rewritten by the time information correction unit 6 are synchronized with the system clocks Cr generated by the clock generator 7.

The time information correction unit 6 compares the pre-correction PCR and the post-correction PCR' in order to correct the degree-two multiplexing timing deviation caused by the difference in the system clocks of the degree-one multiplexers 2a to 2n and those of the degree-two multiplexer 3. If the difference between the precorrection PCR, as an output timing value of a given degree-one multiplexed streams and the post-correction PCR', as an output timing of the degree two multiplexed stream, is in excess of a predetermined threshold value, the time information correction unit 6 gives this information to the switching unit 5. When fed with this information, the switching unit 5 inserts a dummy packet in place of the transport packet of the degree-one multiplexed stream the difference of the PCR of which has exceeded a threshold value. That is, the switching unit 5 inserts this dummy packet into a packet on the interleaving pattern into which this degree-one multiplexed stream was scheduled to be degree-two multiplexed next time. This dummy packet is a null packet prescribed in, for example, ISO818-1. This null packet is not inputted into the decoder buffer but is simply read and disregarded without affecting the decoding processing.

The time information correction unit 6 performs this correcting and comparing operations on the PCRs encoded in the totality of the degree-one multiplexed streams.

Figure 10A:
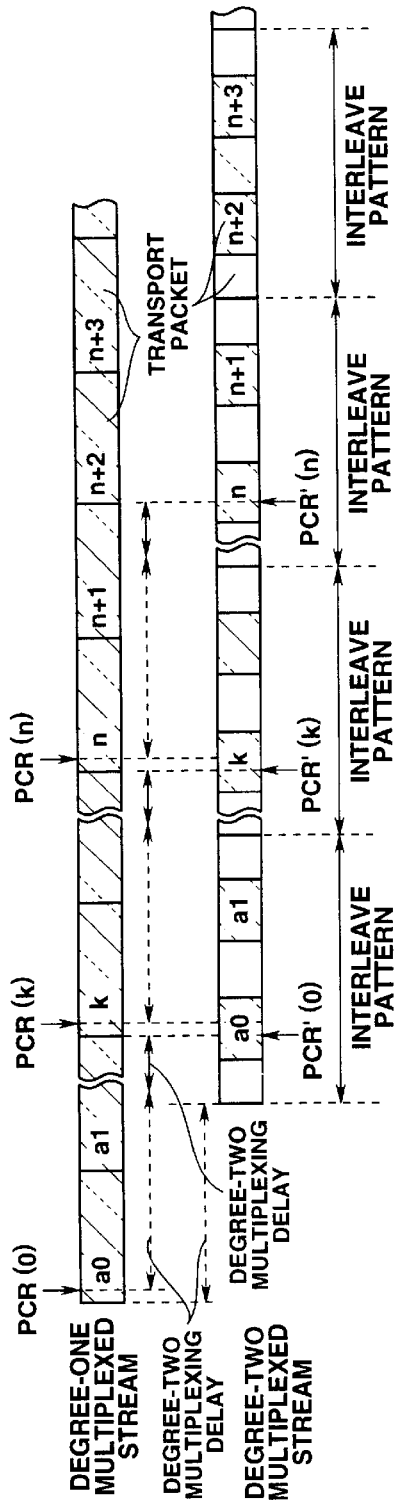
FIGS. 10A and 10B illustrate the operation of dummy packet insertion in the multiplexing system of FIG. 9.
Figure 10B:
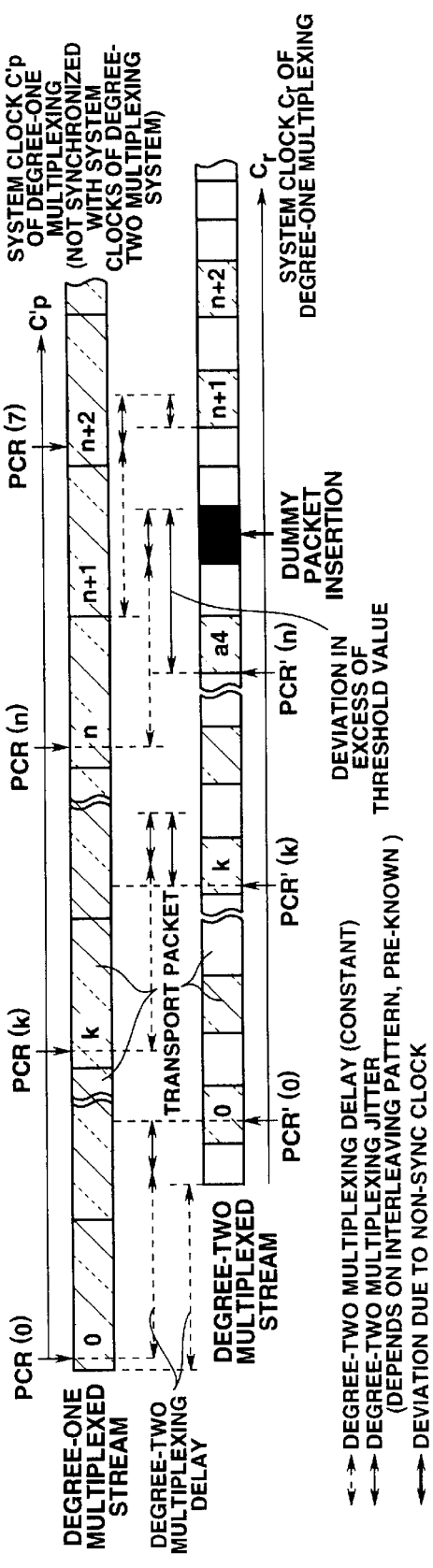

The operation of inserting dummy packets in this multiplexing system 1 is now explained with reference to FIGS. 10A and 10B as comparison is made between the synchronous system and the asynchronous system. FIG. 10A shows the degree-one and degree-two multiplexed streams for the synchronous system and FIG. 10B shows the degree-one and degree-two multiplexed streams in this major surface 1 which is the a synchronous system.

In the case of the synchronous system in which the system clocks Cp of the degree-one multiplexers are synchronized with the system clocks Cr of the degree-two multiplexer, the degree-two multiplexing timing deviation is only the degree-two multiplexing jitter, with the deviation not being accumulated, by performing degree-two multiplexing in accordance with the interleaving pattern as set based on the bitrate assigned to the degree-one multiplexers, as shown in FIG. 10A.

In the case of the asynchronous system in which the system clocks of the degree-one and degree-two multiplexers are not synchronized with each other, the degree-two multiplexing jitter deviation due to the asynchronous system clocks is accumulated if degree-two multiplexing is executed in accordance with the interleaving pattern.

This multiplexing system 1 compares the encoded pre-correction PCR value, encoded on the basis of the outputting timing of the degree-one multiplexed streams, to the post-correction PCR', as corrected by the time information correction unit 6 of the degree-two multiplexer 3. Meanwhile, if, in the major surface 1, there is no degree-two multiplexing timing deviation, the delay until starting of the degree-two multiplexing, that is degree-two multiplexing delay, is added as an offset to the PCR' to equate the pre-correction PCR value to the post-correction PCR'. The reason is that, unless the offset corresponding to the degree-two multiplexing delay is used, the PCR decoded into the degree-one multiplexed streams cannot be matched to the decoding time or the other time information.

In the difference between the pre-correction PCR encoded into the degree-one multiplexed streams and the PCR' generated by the time information correction unit 6, there are contained the degree-two multiplexing jitter and the degree-two multiplexing timing deviation produced by the difference in the system clocks proper to the asynchronous system. The degree-two multiplexing jitter is produced in the synchronous system, as discussed above, and can be found based on the interleaving pattern. Therefore, the degree-two multiplexing timing deviation produced by the difference in the system clocks proper to the asynchronous system can be found from the difference between the pre-correction PCR encoded in the degree-one multiplexed streams and PCR' generated by the time information correction unit 6 and from the degree-two multiplexing jitter produced in this synchronous system. The time information correction unit 6 compares the degree-two multiplexing timing deviation produced by the difference in the system clocks and a pre-set threshold for this deviation. If the deviation surpasses this threshold value, a dummy packet (null packet) is inserted into the transport packet of the degree two multiplexed stream into which was scheduled to be multiplexed the transport packet responsible for this deviation.

Specifically, no particular correction processing is performed on the PCR(k) encoded in the transport packet k or on the PCR'(k) encoded in the transport packet following degree-two multiplexing of the transport packet k, because the degree-two multiplexing timing deviation due to the difference in the system clocks is not larger than the threshold value, as shown in FIG. 10B. On the other hand, the degree-two multiplexing timing deviation due to the difference in the system clocks between the PCF(n) encoded in the transport packet and the PCR'(n) encoded in the transport packet following the degree-two multiplexing of the transport packet (n) is not less than a threshold value. Therefore, the dummy packet (null packet) is inserted into a transport packet of a degree two multiplexed stream, into which the transport packet of the degree two multiplexed stream was scheduled to be degree-two multiplexed in the inherent interleaving pattern. A transport packet n+1 of the degree-one multiplexed stream is degree-two multiplexed into the transport packet of the degree two multiplexed stream, into which a transport packet n+2 of the degree-one multiplexed stream was inherently scheduled to be degree-two multiplexed. Subsequently, degree-two multiplexing is continued as the transport packets incremented by one each time are degree-two multiplexed.

Meanwhile, the degree-two multiplexing timing deviation due to the difference in the system clocks can be minimized by setting the above threshold value so as to be equal to one-half the transport packet of the degree-one multiplexed stream. That is, since the deviation between the output timing of the transport packet envisaged by the degree-one multiplexers 2a to 2n and the output timing of the transport packet of the transport packet outputted by the degree-two multiplexer 3 is the sum of the degree-two multiplexing jitter generated in the synchronous system and the maximum value of the deviation caused by the difference of the system clocks, it is possible to set the maximum value of the sum of the deviation as being known from the outset.

Therefore, in the multiplexing system 1, pre-set margins are provided for the respective degree-one multiplexers 2a to 2n so that the decoder buffer will be prohibited against failure even if the deviation corresponding to the known maximum value of the deviation is produced in generating the degree two multiplexed stream, thereby constructing a safe system free from failure of the decoder buffer.

Meanwhile, in the above-described processing of inserting dummy packets by the time information correction unit 6 based on PCR comparison, it is presumed that the degree-two multiplexing timing is faster than the output timing of the degree-one multiplexed streams, that is that the system clocks Cp1 to Cpn of the degree-one multiplexers are slower than the system clocks Cr of the degree-two multiplexer. In order to render this processing effective even in such cases wherein the degree-two multiplexing timing is slower than the output timing of the degree-one multiplexed streams, that is in which the system clocks Cp1 to Cpn of the degree-one multiplexers are faster than the system clocks Cr of the degree-two multiplexer, the degree-one multiplexers 2a to 2n of the multiplexing system 1 are designed to output degree-one multiplexed streams at a bitrate lower than the assigned bitrate.

Referring to FIG. 11, the bitrate of the degree-one multiplexed streams outputted by the degree-one multiplexers 2a to 2n in the multiplexing system is explained. Specifically, FIG. 11A shows the bitrate (bit generation quantity per second) of the degree-one multiplexed streams in case the system clocks Cp are synchronized with the system clocks Cr, FIG. 11B shows the bitrate of the degree-one multiplexed streams in case the system clocks Cp are slower than the system clocks Cr, FIG. 11C shows the bitrate of the degree-one multiplexed streams in case the system clocks Cp are faster than the system clocks Cr and FIG. 11D shows the bitrate of the degree-one multiplexed streams in the multiplexing system 1.

If the system clocks Cp are synchronized with the system clocks Cr, the time measured by the system clocks Cp is equal to that measured by the system clocks Cr, as shown in FIG. 11A, so that the bitrate of the degree-one multiplexed streams outputted by the degree-one multiplexers 2a to 2n is kept unchanged with degree-two multiplexed output of the degree-two multiplexer 3.

If the system clocks Cp of the degree-one multiplexers are slower than the system clocks Cr of the degree-two multiplexer, one second time as measured by the system clocks Cp is longer than the one-second time as measured by the system clocks Cr, as shown in FIG. 11B. Therefore, the degree-one multiplexed streams, with the bitrate P, outputted on the basis of the system clocks Cp, appear as degree-one multiplexed streams with the bitrate of (Cp/Cr)XP, when looking from the side of the system clocks Cr of the degree-two multiplexer.

Conversely, if the system clocks Cp of the degree-one multiplexers are faster than the system clocks Cr of the degree-two multiplexer, one second time as measured by the system clocks Cp is shorter than the one-second time as measured by the system clocks Cr, as shown in FIG. 11C. Therefore, the degree-one multiplexed streams, with the bitrate P, outputted based on the system clocks Cp, appear as degree-one multiplexed streams with the bitrate of (Cp/Cr) XP when looking from the side of the system clocks Cr of the degree-two multiplexer.

Thus, the degree-one multiplexers 2a to 2n of the multiplexing system 1 outputs a degree-one multiplexed stream with a bitrate of βXP for the bitrate P assigned thereto based on the interleaving pattern.

In the present multiplexing system 1, this β is set as follows:

If the system clocks of the actual degree-one multiplexers and the degree-two multiplexer are known from the outset, degree-two multiplexing can be realized in accordance with the interleaving pattern by setting the value of β to Cr/Cp. However, the system clocks of the degree-one multiplexers and the degree-two multiplexer are unknown such that the system clocks per se are liable to be changed. Thus, this multiplexing system 1 exploits the fact that the clock oscillator has its precision defined in terms of an error range and sets the maximum value that can be taken by the system clocks to CpMAX and the minimum value that can be taken by the system clocks of the degree-two multiplexer to CrMIN to set β to CrMIN/CpMAX based on these set values.

Thus, if degree-one multiplexer outputs a degree-one multiplexed stream with a bitrate (CrMIN/CpMAX)XP, based on the system clocks Cp, it can be ensured that the degree-one multiplexed stream with the bitrate of(CrMIN/CpMAX)XP based on the system clocks Cp, when viewed from the side of the system clocks Cr of the degree-two multiplexer, is necessarily smaller in the bitrate than the bitrate P inherently assigned to the degree-one multiplexer, as shown by the following formula:

$$(Cp/Cr) X \beta XP = (Cp/Cr) X (CrMIN/CpMAX) XP > P.$$

If the bitrate of the degree-one multiplexed streams outputted by the degree-one multiplexers 2a to 2n is set as described above, it can be ensured that the degree-two multiplexing timing is faster than the output timing of the degree-one multiplexed stream. Thus, with the multiplexing system 1, it is possible to correct the deviation caused by the difference in the system clocks by a processing of comparing the PCRs by the time information correction unit 6 and inserting a dummy packet without regard to the size of the system clocks Cp of the degree-one multiplexor and the system clocks Cr of the degree-two multiplexer.

Thus, with the multiplexing system 1 embodying the present invention, the degree two multiplexed stream can be generated without disrupting the reception memories 4a to 4n or the decoder buffer.

With the present multiplexing system 1, in which the bitrate of the respective degree-one multiplexers can be changed by changing the interleaving pattern, while the interleaving pattern can be changed responsive to the bitrates of the respective degree-one multiplexed streams, it is possible to effect control by statistic multiplexing by performing control to provide a constant bitrate of the degree two multiplexed stream which represents the overall bitrate, with the degree-one multiplexed streams being variable. It is thus possible to distribute the bitrate depending on the encoding difficulty of the degree-one multiplexed streams to improve the overall picture quality.

Also, since there is no necessity of restoring the system clocks of the respective degree-one multiplexers 2a to 2n using the PLL, the degree-one multiplexed streams can be transferred by a bus employing the burst-like data transfer system, such as a PCI bus.

Also, in the multiplexing system 1, in which the degree-two multiplexing delay sufficient to assure the arrival at the respective reception memories 4a to 4n of the degree-one multiplexed streams, burst-like properties in the data transfer of the degree-one multiplexed streams can be absorbed by the degree-two multiplexer 3 to enable data transfer of the degree-one multiplexed streams to be made using the totality of buses.

In the above-described embodiment of the present invention, the degree-one multiplexed streams and the degree two multiplexed stream are transport streams provided in ISO13818-1. However, the present invention may be applied not only to the transport stream provided in ISO13818-1 but also to any degree-one multiplexed streams or degree two multiplexed stream obtained on time-divisionally multiplexing bitstreams of digital signals.

In the above-described embodiment of the present invention, the time reference value encoded in the degree-one multiplexed streams and the degree two multiplexed stream is the PCR prescribed in ISO13138-1. However, the present invention is not limited to the case the time reference value is the PCR prescribed in ISO13138-1 but may be applied to a case in which the time reference value is an arbitrary time reference attached to the bitstream.

What is claimed is:

1. A digital signal multiplexing apparatus in which degree-one multiplexed streams are received from a plurality of degree-one multiplexers and in which the received degree-one multiplexed streams are time-divisionally multiplexed to generate a degree two multiplexed stream, said degree-one multiplexed streams being a time-divisionally multiplexed bitstream of one or more digital signals having a time reference value attached thereto, comprising:

reception means for receiving a plurality of degree-one multiplexed streams from said degree-one multiplexers;

multiplexing means for time-divisionally multiplexing the received degree-one multiplexed streams based on a repetitive pattern associated with a bitrate of the degree-one multiplexed streams to generate the degree two multiplexed stream; and time reference value correction means for operating based on asynchronous reference clocks not synchronized with reference clocks for operating the degree-one multiplexers and for correcting the time reference value appended to said degree two multiplexed stream;

said multiplexing means multiplexing a pre-set quantity of dummy data if the time reference value corrected by said time reference value correction means becomes larger than the time reference value attached to the degree-one multiplexed streams by the degree-one multiplexers by a value larger than a pre-set value.

2. The digital signal multiplexing apparatus according to claim 1 wherein said reception means receives from the respective degree-one multiplexers the degree-one multiplexed streams of a bitrate lower than a bitrate assigned on the basis of a repetitive pattern for multiplexing by said multiplexing mean (assigned bitrate).

3. The digital signal multiplexing apparatus according to claim 2 wherein said reception means receives from the respective degree-one multiplexers the degree-one multiplexed streams of a bitrate represented by $$(CrMIN/CpMAX)XP$$

where CrMIN is the minimum value of the rating of the reference clocks for operating said time reference value correction means, CpMAX is the minimum value of the rating of the reference clocks for operating said degree-one multiplexers and P is the assigned bitrate.

4. The digital signal multiplexing apparatus according to claim 1 wherein said multiplexing means time-divisionally multiplexes the respective received degree-one multiplexed streams after lapse of delay exceeding the maximum delay time of the degree-one multiplexed streams generated by said reception memories.

5. The digital signal multiplexing apparatus according to claim 1 wherein said reception memories receive a transport stream prescribed by ISO13818-1 and wherein said multiplexing means generates a transport stream provided in ISO13818-1.

6. The digital signal multiplexing apparatus according to claim 5 wherein said time reference value correction means corrects a program clock reference (PCR) value attached to a transport stream prescribed by ISO13818-1.

7. The digital signal multiplexing apparatus according to claim 5 wherein said multiplexing means multiplexes a null packet prescribed in ISO13818-1.

8. A method for multiplexing digital signals comprising:

receiving degree-one multiplexed streams from a plurality of degree-one multiplexers, said degree-one multiplexed streams being a time-divisionally multiplexed bitstream of one or more digital signals having a time reference value attached thereto;

time-divisionally multiplexing received degree-one multiplexed streams based on a repetitive pattern associated with the bitrate of respective degree-one multiplexed streams to generate a degree two multiplexed stream;

correcting the time reference value attached to the time reference value attached to the degree two multiplexed stream based on asynchronous reference clocks not synchronized with reference clocks for operating said degree-one multiplexers; and multiplexing a pre-set volume of dummy data if the corrected time reference value exceeds the time reference value attached to the degree-one multiplexed streams by more than a predetermined value.

9. The method for multiplexing digital signals according to claim 8 wherein the degree-one multiplexed streams of a bitrate lower than the bitrate assigned based on the repetitive pattern for multiplexing (assigned bitrate).

10. The digital signal multiplexing method according to claim 9 wherein the degree-one multiplexed streams of a bitrate represented by $$(CrMIN/CpMAX)XP$$

are received from the respective degree-one multiplexers, where CrMIN is the minimum value of the rating of the reference clocks for operating said time reference value correction means, CpMAX is the minimum value of the rating of the reference clocks for operating said degree-one multiplexers and P is the assigned bitrate.

11. The digital signal multiplexing method according to claim 8 wherein the respective received degree-one multiplexed streams are time-divisionally multiplexed after lapse of delay exceeding the maximum delay time of the degree-one multiplexed streams generated by reception.

12. The digital signal multiplexing method according to claim 8 wherein a transport stream prescribed by ISO13818-1 is received and wherein a transport stream provided in ISO13818-1 is generated.

13. The digital signal multiplexing method according to claim 12 wherein a program clock reference (PCR) value attached to a transport stream prescribed by ISO13818-1 is corrected.

14. The digital signal multiplexing method according to claim 12 wherein said multiplexing means multiplexes a null packet prescribed in ISO13818-1 as dummy data.

15. An apparatus for transmitting digital signals comprising:
a plurality of degree-one multiplexers for time-divisionally multiplexing a bitstream of one or more digital signals and for attaching a time reference value to generate a plurality of degree-one multiplexed streams; and
a degree-two multiplexing device including reception means for receiving plural degree-one multiplexed streams from said degree-one multiplexers, multiplexing means for time-divisionally multiplexing the received degree-one multiplexed streams based on a repetitive pattern associated with the bitrate of respective degree-one multiplexed streams to generate a degree two multiplexed stream, time reference value correcting means for correcting the time reference value attached to the degree two multiplexed stream based on asynchronous reference clocks not synchronized with reference clocks adapted for operating said degree-one multiplexers and transmission means for transmitting the degree two multiplexed stream generated by said multiplexing means, said degree-two multiplexing device multiplexing a pre-set volume of the dummy data when the time reference value corrected by said time reference value correction means becomes larger than the time reference value attached to the degree-one multiplexed streams by the degree-one multiplexers by a value larger than a pre-set value.

16. The digital signal transmitting apparatus according to claim 15 wherein each degree-one multiplexer generates a degree-one multiplexed stream at a bitrate lower than the bitrate assigned based on the repetitive pattern for multiplexing (assigned bitrate).

17. The digital signal transmitting apparatus according to claim 15 wherein the degree-one multiplexed streams of a bitrate represented by $$(CrMIN/CpMAX)XP$$

are generated by the degree-one multiplexers, where CrMIN is the minimum value of the rating of the reference clocks for operating said time reference value correction means, CpMAX is the minimum value of the rating of the reference clocks for operating said degree-one multiplexers and P is the assigned bitrate.

18. The digital signal transmitting apparatus according to claim 15 wherein the respective received degree-one multiplexed streams are time-divisionally multiplexed by the multiplexing means of said degree-two multiplexer after lapse of delay exceeding the maximum delay time of the degree-one multiplexed streams generated by reception.

19. A digital signal transmitting method comprising:
time-divisionally multiplexing a bitstream of one or more digital signals by pre-set reference clocks and attaching a time reference value for generating a plurality of degree-one multiplexed streams;
receiving said degree-one multiplexed streams;
time-divisionally multiplexing the received degree-one multiplexed streams, based on a repetitive pattern associated with the bitrate of each degree-one multiplexed stream, to generate a degree two multiplexed stream;
correcting the time reference value attached to the degree two multiplexed stream based on reference clocks not synchronized with the reference clocks adapted for generating each degree-one multiplexed stream for transmitting the degree two multiplexed stream; and
transmitting the degree two multiplexed stream, on which are multiplexed a pre-set volume of the dummy data, if the corrected time reference value has become than the time reference value attached to the degree-one multiplexed streams by the degree-one multiplexers by a value larger than a pre-set value.

20. The digital signal transmitting method according to claim 19 wherein said degree-one multiplexed streams of a bitrate lower than a bitrate assigned on the basis of a repetitive pattern for multiplexing (assigned bitrate) are generated.

21. The digital signal transmitting method according to claim 20 wherein said degree-one multiplexed streams of a bitrate represented by $$(CrMIN/CpMAX)XP$$

are generated, where CrMIN is the minimum value of the rating of the reference clocks for operating said time reference value correction means, CpMAX is the minimum value of the rating of the reference clocks for operating said degree-one multiplexers and P is the assigned bitrate.

22. The digital signal transmitting method according to claim 19 wherein said degree-one multiplexed streams are time-divisionally multiplexed after lapse of delay exceeding the maximum delay time generated by transmission of the degree-one multiplexed streams.

23. An apparatus for recording digital signals comprising:
a plurality of degree-one multiplexers for time-divisionally multiplex a bitstream of one or more digital signals and for attaching a time reference value to generate a plurality of degree-one multiplexed streams; and a degree-two multiplexing device including reception means for receiving degree-one multiplexed streams from said degree-one multiplexers, multiplexing means for time-divisionally multiplexing the received degree-one multiplexed streams based on a repetitive pattern associated with the bitrate of respective degree-one multiplexed streams to generate a degree two multiplexed stream, time reference value correction means for correcting the time reference value attached to the degree two multiplexed stream based on asynchronous reference clocks not synchronized with reference clocks adapted for operating said degree-one multiplexers and recording means for recording the degree two multiplexed stream generated by said multiplexing means on a recording medium, said degree-two multiplexing device multiplexing a pre-set volume of the dummy data when the time reference value corrected by said time reference value correction means becomes larger than the time reference value attached to the degree-one multiplexed streams by the degree-one multiplexers by a value larger than a pre-set value.

24. The digital signal recording apparatus according to claim 23 wherein said degree-one multiplexers generate the degree-one multiplexed streams of a bitrate lower than a bitrate assigned on the basis of a repetitive pattern for multiplexing by said multiplexing mean (assigned bitrate).

25. The digital signal recording apparatus according to claim 24 wherein said degree-one multiplexers generate the degree-one multiplexed streams of a bitrate represented by (CrMIN/CpMAX)XP where CrMIN is the minimum value of the rating of the reference clocks for operating said time reference value correction means, CpMAX is the minimum value of the rating of the reference clocks for operating said degree-one multiplexers and P is the assigned bitrate.

26. The digital signal recording apparatus according to claim 23 wherein said multiplexing means of said degree-two multiplexer time-divisionally multiplexes the respective received degree-one multiplexed streams after lapse of delay exceeding the maximum delay time of the degree-one multiplexed streams generated by transmission by said degree-one multiplexers.

27. A digital signal recording method comprising:

time-divisionally multiplexing a bitstream of one or more digital signals by pre-set reference clocks and attaching a time reference value for generating a plurality of degree-one multiplexed streams;

receiving said degree-one multiplexed streams;

time-divisionally multiplexing the received degree-one multiplexed streams, based on a repetitive pattern associated with the bitrate of each degree-one multiplexed stream, to generate a degree two multiplexed stream;

correcting the time reference value attached to the degree two multiplexed stream based on reference clocks not synchronized with the reference clocks adapted for generating each degree-one multiplexed stream for recording the degree two multiplexed stream; and recording the degree two multiplexed stream, on which are multiplexed a pre-set volume of the dummy data, if the corrected time reference value has become than the time reference value attached to the degree-one multiplexed streams by the degree-one multiplexers by a value larger than a pre-set value.

28. The digital signal recording method according to claim 27 wherein said degree-one multiplexed streams of a bitrate lower than a bitrate assigned on the basis of a repetitive pattern for multiplexing (assigned bitrate) are generated.

29. The digital signal recording method according to claim 28 wherein said degree-one multiplexed streams of a bitrate represented by (CrMIN/CpMAX)XP are generated, where CrMIN is the minimum value of the rating of the reference clocks for operating said time reference value correction means, CpMAX is the minimum value of the rating of the reference clocks for operating said degree-one multiplexers and P is the assigned bitrate.

30. The digital signal recording method according to claim 27 wherein said degree-one multiplexed streams are time-divisionally multiplexed after lapse of delay exceeding the maximum delay time generated by transmission of the degree-one multiplexed streams.

31. A recording medium having a degree two multiplexed stream recorded thereon, said degree two multiplexed stream being recorded on the recording medium by:

time-divisionally multiplexing a bitstream of one or more digital signals by pre-set reference clocks and attaching a time reference value for generating a plurality of degree-one multiplexed streams;

time-divisionally multiplexing the received degree-one multiplexed streams, based on a repetitive pattern associated with the bitrate of each degree-one multiplexed stream, to generate a degree two multiplexed stream;

correcting the time reference value attached to the degree two multiplexed stream based on reference clocks not synchronized with the reference clocks adapted for generating each degree-one multiplexed stream; and recording the degree two multiplexed stream on the recording medium; on the condition that the degree two multiplexed stream is recorded in a state in which a pre-set volume of the dummy data are multiplexed thereon if the corrected time reference value has become than the time reference value attached to the degree-one multiplexed streams by a value larger than a pre-set value.

* * * * *